United States Patent [19]
Kotten

[11] Patent Number: 5,867,293
[45] Date of Patent: Feb. 2, 1999

[54] CIRCUIT ARRANGEMENT FOR DISPERSION COMPENSATION IN OPTICAL TRANSMISSION SYSTEMS BY MEANS OF AN OPTICAL FILTER

[75] Inventor: Klaus Kotten, Munich, Germany

[73] Assignee: Siemens Aktiengesellschaft, Munich, Germany

[21] Appl. No.: 633,014

[22] Filed: Apr. 16, 1996

[30] Foreign Application Priority Data

Apr. 25, 1995 [DE] Germany .................... 195 15 158.5

[51] Int. Cl.$^6$ .................................................. H04B 10/00
[52] U.S. Cl. ............................. 359/161; 385/27; 385/42
[58] Field of Search .................................. 359/127, 140, 359/161; 385/39, 41–42, 48, 27

[56] References Cited

U.S. PATENT DOCUMENTS

| | | | |
|---|---|---|---|
| 4,976,518 | 12/1990 | Burns ........................................ | 385/27 |
| 4,997,249 | 3/1991 | Berry et al. ............................... | 385/27 |
| 5,475,525 | 12/1995 | Tournois et al. ........................ | 359/245 |
| 5,602,666 | 2/1997 | Ishikawa et al. ........................ | 359/161 |

FOREIGN PATENT DOCUMENTS

| | | |
|---|---|---|
| 0 165 773 | 12/1985 | European Pat. Off. . |
| 0 432 544 | 6/1991 | European Pat. Off. . |
| 0 701 340 | 3/1996 | European Pat. Off. . |
| 2191646 | 12/1987 | United Kingdom .................. 359/161 |
| WO92/17803 | 10/1992 | WIPO . |

OTHER PUBLICATIONS

Optoelectronic Equalisation –8342 IEEE Photonics Technology Letters 6(1994)Apr. No. 4, New York, US.
Design of least–mean–square based adaptive optical equalizers –2319 Optics Communications 91(1992)15 Jul. No. 3/4, Amsterdam, NL.
Patent Abstracts of Japan –02159129 –12–12–88 –Equalizer.
2219 Applied Optics 29 (1990) 10 Mar. No. 8, New York, US.
Direct Form I Fiber–Optic Discrete–Time Signal Processors Using Optical Amplifiers and Embedded Mach–Zehnder Structures–Jose Capmany et al. –8342 IEEE Photonics Technology Letters 5 (1993) Jul. No. 7, New York, US.
Coherent Optical Transversal Filter Using Silica–Based Waveguides for High–Speed Signal Processing –Sasayama et al –8217 Journal of Lightwave Technology 9(1992) Oct. No. 10, New York, US.
Communication Systems –An Introduction to Signals and Noise in Electrical Communication –Bruce Carlson–McGrawy Hill –Electrical & Electron –Engineering Series –1986.
Quantum Electronics –Third Edition –Amnon Yariv –John Wiley & Sons, Inc. –pp. 125–127.
Mikro–elektronische Filter –Eigler –Verlag Technik Berlin —Herausgegeben von Prof. Dr. sc. techn. pp. 186–271.
P. Bocker –Datenuebertragung –Springer–Verlag –Siemens Band 1 Grundlagen pp. 214–231.
Journal of Lightwave Technology, vol. 12, No. 4, Apr. 1994 –Photonic FDM Multichannel Selector Using Coherent Optical Transversal Filter –Koji Sasayama–Member, IEEE–pp. 664–669.
Design Of a Variable Group–Delay Dispersion Equalizer Using A Lattice–Form Programmable Optical Frequency Filter –Jinguji et al–NTT Opto–Electronics Laboratories –vol. 2–pp.849–852.

*Primary Examiner*—Kinfe-Michael Negash
*Attorney, Agent, or Firm*—Hill & Simpson

[57] ABSTRACT

In a circuit arrangement for dispersion compensation in optical transmission systems by means of an optical filter, an optical transverse filter is provided as a negative dispersion filter, and which has a series of directional couplers which respectively follow one another at a spacing of τ/2 and are operated as splitters. A series of directional couplers are provided which likewise follow one another at a spacing of τ/2 and are operated as combiners, the second output of each directional coupler of the directional couplers operated as splitters leading in each case to the second input of the respectively corresponding directional coupler operated as a combiner.

7 Claims, 3 Drawing Sheets

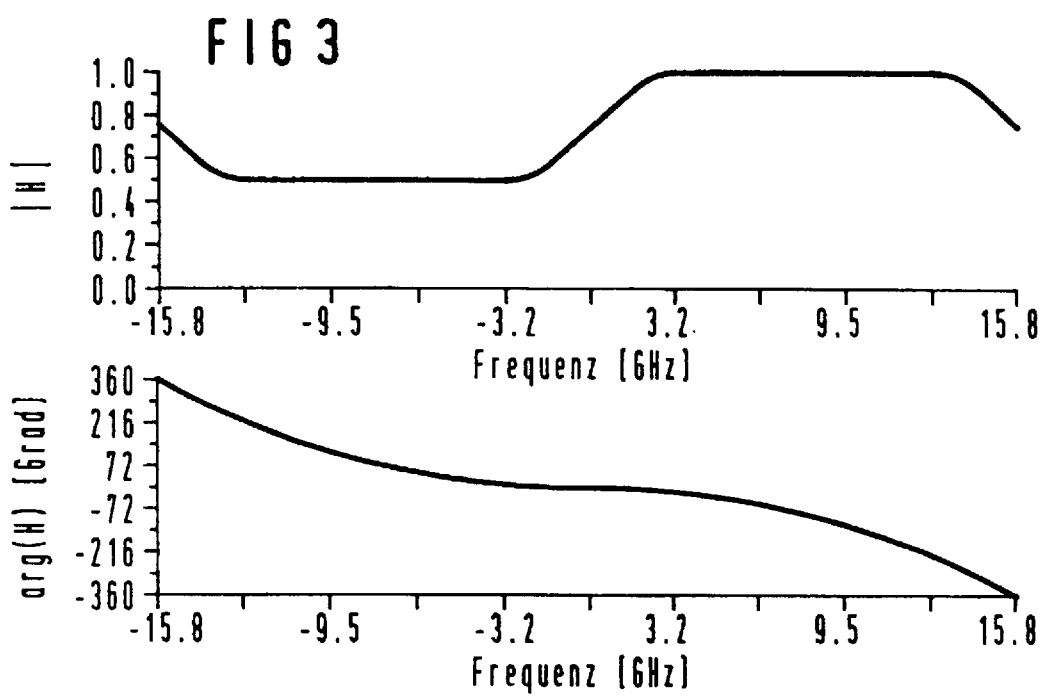
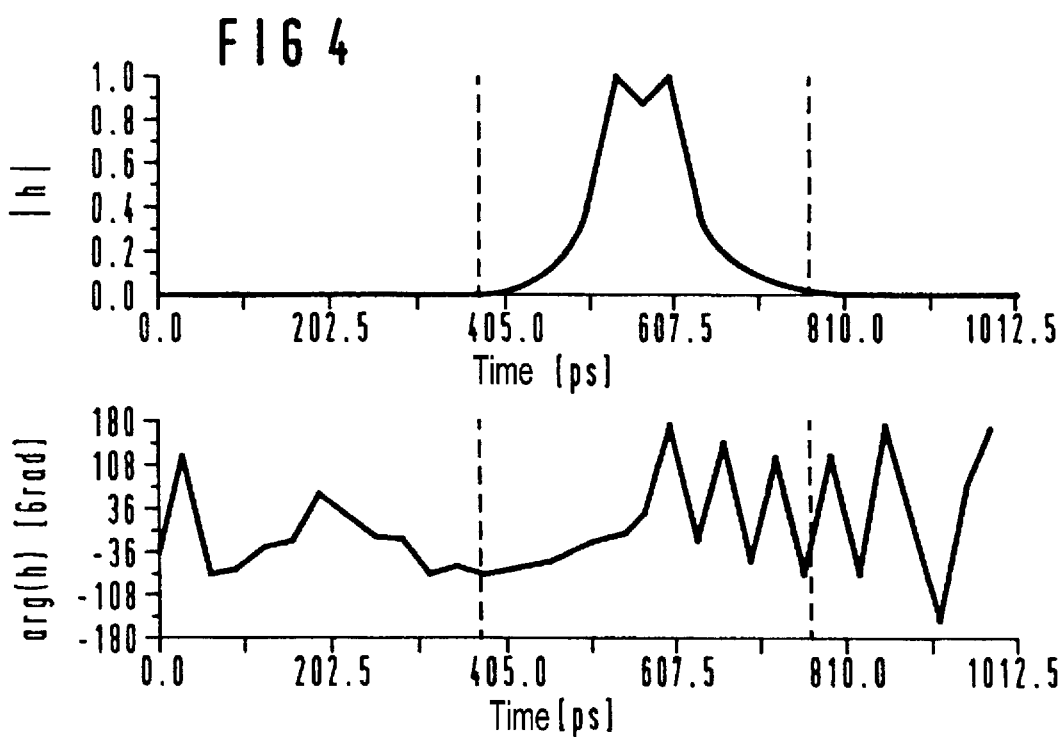

CIRCUIT ARRANGEMENT FOR DISPERSION COMPENSATION IN OPTICAL TRANSMISSION SYSTEMS BY MEANS OF AN OPTICAL FILTER

BACKGROUND OF THE INVENTION

In the case of optical communication with data rates in the range of Gbit/s via an optical waveguide, the fiber dispersion is decisive for the bridgeable link length. This also applies, in particular, in the wavelength window around 1.55 µm, since here the attenuation can be eliminated by means of optical amplifiers, while the dispersion of a standard fiber has very large positive values at approximately 17 ps/nm/km. There is therefore an interest in components which have a negative dispersion and can thus form a dispersion-free transmission medium in conjunction with the standard fiber. For very broadband applications such as wavelength division multiplexing (WDM), it would also be desirable, moreover, to be able to compensate the rise (approximately 0.06 ps/nm$^2$/km at 1.55 µm) in the dispersion of the standard fiber. Moreover, components can be of interest which have a dispersion which is variable (including in sign), in order to be able to compensate, for example, the residual dispersion of a dispersion-shifted fiber at the transmitter wavelength.

The use of passive, linear principles is interesting for dispersion compensation since, so long as no nonlinear effects occur in the transmission, they permit the use of compensation components at any desired location on the optical transmission link. In the case of the passive principles in particular, there is also the prospect of cost-effective and compact components.

Apart from dispersion-compensating fibers (also currently commercially available), various components have already been presented in conjunction with dispersion compensation: Fabry-Perot interferometers, ring resonators, cascaded Mach-Zehnder interferometers, cascaded birefringent crystals, free-beam optical systems with gratings, and chirped gratings.

SUMMARY OF THE INVENTION

It is an object of the invention to provide a different way for dispersion compensation in optical transmission systems.

According to the invention, a circuit arrangement is provided for dispersion compensation in optical transmission systems by means of an optical filter. This circuit arrangement has an optical transverse filter provided as a negative dispersion filter. In this case, in a further embodiment of the invention, it is possible for the optical transverse filter to have a series of directional couplers which respectively follow one another at a spacing of $\tau/2$ and are operated as splitters, and a series of directional couplers, which likewise follow one another at a spacing of $\tau/2$ and are operated as combiners. The second output of each directional coupler of the directional couplers operated as splitters lead in each case to the second input of the respectively corresponding directional coupler operated as a combiner.

The invention is attended by the advantage of dispersion and transmission having largely freely selectable characteristics, the product of the dispersion and the square of the bandwidth fixed by the filter being capable of increasing virtually linearly with the number of filter branches.

Further characteristics of the invention will become clear from the following more detailed explanation of the invention with the aid of the drawings.

BRIEF DESCRIPTION OF THE DRAWINGS

FIG. 3 shows a characteristic of the transfer function of a filter for dispersion compensation;

FIG. 4 shows the pulse response to this transfer function;

DESCRIPTION OF THE PREFERRED EMBODIMENTS

Figure 1:
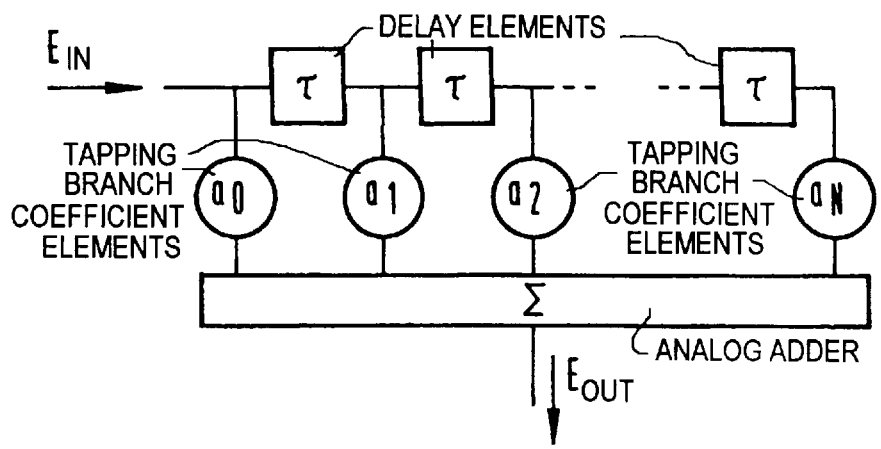
FIG. 1 shows a block diagram of a transverse filter.

FIG. 1 shows in a diagram a transverse filter having a delay line composed of N delay elements ($\tau$) with a propagation delay $\tau$ and N+1 tapping branches provided with coefficient elements $a_0, \ldots, a_N$ which can be set to a respective filter coefficient (sampled value) and lead to an analog adder $\Sigma$. Transverse filters are generally known (see, for example, Bocker: Datenübertragung [Data transmission], Berlin-Heidelberg-New York 1976, Volume 1, Chapter 5.3.2) and require no more detailed explanation here. The realization of optical transverse filters in planar form on a silicon substrate is likewise known per se (from J. Lightwave Technol., Volume 12 (1994), pages 664 . . . 669), and so there is also no need for any further explanation here. A simple structure of an optical transverse filter is shown in FIG. 2.

Figure 2:
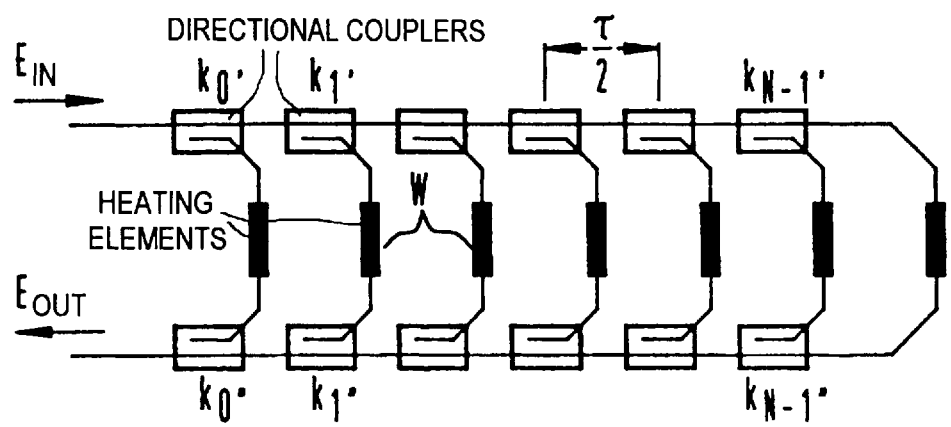
FIG. 2 shows an exemplary embodiment of an optical transverse filter.

In accordance with FIG. 2, the optical transverse filter has a series of directional couplers $k_0', k_1', \ldots, k_{N-1}'$, which respectively follow one another at a spacing of $\tau/2$ and are operated as splitters, and a series of directional couplers $k_0'', k_1'', \ldots, k_{N-1}''$, which likewise follow one another at a spacing of $\tau/2$ and are operated as combiners, the second output of each directional coupler of the directional couplers $k_0', k_1', \ldots, k_{N-1}'$ operated as splitters leading in each case to the second input of the respectively corresponding directional coupler $k_0'', k_1'', \ldots, k_{N-1}''$ operated as a combiner. Heating elements W, which will be considered in detail further below, can be fitted in the individual branches of the optical transverse filter.

The amplitudes of the individual filter coefficients are realized by the coupling factors of the individual splitters and combiners, it being necessary when dimensioning also to take account of the effects of the couplers situated upstream of the respective splitter or downstream of the respective combiner. The filter structure is expediently symmetrical, that is to say the same coupling factors are provided for coupling out and launching, with the result that additional losses are avoided when combining the power components.

For a transverse filter, the complex transfer function $H(j\omega)$ for the electric field strength and the pulse response $h(t)$ to a $\delta$ pulse are as follows:

$$H(j\omega) = \sum_{k=0}^{N} a_k \cdot e^{-jk\omega\tau} \tag{1}$$

and $$h(t) = \sum_{k=0}^{N} a_k \cdot \delta(t - k\tau), \tag{2}$$

where $\delta(t)$ is the delta function.

The pulse response of the filter is yielded by Fourier transformation of $H(j\omega)$ in the time domain. If, as is the case in accordance with equation (2) for a transverse filter, the pulse response is time-discrete, the result is a periodic frequency response of the filter with a periodicity (Free Spectral Range FSR) of FSR=$1/\tau$.

It then holds for the transmission of the optical power as a function of the angular frequency $\omega$ that:

$$\text{transmission } (\omega) = |H(j\omega)|^2; \quad (3)$$

the characteristic of the phase $\phi(\omega)$ against $\omega$ is $$\phi(\omega) = \arg\{H(j\omega)\}. \quad (4)$$

The envelope delay $T_g(\omega)$ is $$T_g(\omega) = -\frac{d\phi}{d\omega} \quad (5)$$

and the dispersion $D(\omega)$ is $$D(\omega) = \frac{dT_g}{d\lambda}, \quad (6)$$

from which it follows with the relationship $c=\lambda f$ that $$D(\omega) = \frac{d^2\phi(\omega)}{d\omega^2} \frac{2\pi c}{\lambda^2} \quad (7)$$

When considering frequency ranges which are small by comparison with the optical frequency, the mean wavelength can be substituted in equation (7) for $\lambda$.

If the transfer function is stipulated in terms of absolute value and phase (or dispersion), it is possible to determine the pulse response from this by means of Fourier transformation, and the pulse response yields the filter coefficients $a_0 \ldots a_N$ by sampling with the sampling period of $\tau=1/\text{FSR}$.

A filter with a dispersion of $-1000$ ps/nm over a bandwidth of 10 Ghz may be considered by way of example. It is clear from equation (7) that a constant dispersion requires a quadratic characteristic of the phase against $\omega$:

$$\phi(\omega) = \frac{\lambda_0^2}{4\pi c} D\omega^2; \quad (8)$$

here $\lambda_0$ is the wavelength (for example, $\lambda_0 = 1.55 \mu m$) at which the desired dispersion D is to be reached exactly. The characteristics of the absolute value and phase of the transfer function are represented in FIG. 3, as freely selected within certain limits. In the case of the phase, apart from the quadratic characteristic it must also be borne in mind that the difference between the phases at the limits of the range is an integral multiple of 360°, in order to ensure continuous transitions (the section shown of the transfer function repeats periodically). The characteristic of the absolute value was selected such that the range of negative dispersion is in the range of the higher transmission. Here, as well, it is necessary to bear in mind transitions which are as continuous as possible, in order to keep the length of the associated pulse response as short as possible.

It may be noted with regard to a periodic filter characteristic that it permits simultaneous dispersion compensation for a plurality of wavelengths. The dispersion of the useful filter regions following one another at a spacing of FSR=$1/\tau$ is, however, a function of wavelength. At spacings of FSR=$1/\tau$, the component $$\frac{d^2\phi(\omega)}{d\omega^2}$$

in equation (7) always has the same magnitude, which is denoted by K. It is thus possible to represent the dispersion as follows:

$$D_{periodic} = K \frac{2\pi c}{\lambda^2} \quad (12)$$

Differentiating with respect to $\lambda$ produces:

$$\frac{dD_{periodic}}{d\lambda} = -K \frac{4\pi c}{\lambda^3} = \frac{-2}{\lambda} D_{periodic} \quad (13)$$

A dispersion of approximately $-17$ ps/nm is required to compensate the dispersion of a 1 km standard fiber at a wavelength of 1.55 $\mu$m. In this case, equation (13) yields a rise of 0.02 ps/nm$^2$ in the dispersion of the filter ranges following one another at spacings of FSR=$1/\tau$. By contrast, the standard fiber has a rise of approximately 0.06 ps/nm$^2$ in the dispersion per kilometer of length. This rise is thus not compensated; rather, a value of 0.08 ps/nm$^2$km remains, with the result that exact compensation is achieved only for one wavelength. However, in the case of wavelengths situated close to one another, in particular, periodic filter characteristics are also suitable, nevertheless, for wavelength division multiplexing (WDM).

The application of fast Fourier transformation to the transfer function shown in FIG. 3 produces the pulse response represented in FIG. 4. The interpolation points (sampled values), separated by $\tau=1/\text{FSR}$ in each case, are the filter coefficients $a_k$ (in FIG. 1) being sought. Since a branch in the transverse filter (in FIGS. 1 and 2) corresponds to each sample value, as small as possible a number of sampled values should be aimed at. The exemplary embodiment considered here is based on only 13 sampled values which are situated in the time domain bounded by dashed lines in FIG. 4.

As is to be seen in FIG. 4, the phases of the sampled values are predominantly not equal to 0° or 180°, that is to say complex; it therefore holds that:

$$a_k = |a_k| \cdot e^{j\omega_k} \quad (9)$$

However, the pulse response of a transfer function which is capable of being realized cannot have sampled values of arbitrary phases, but must be real; if, as here, the desired transmission response is required only inside a bandwidth which is small by comparison with the absolute (optical) frequency position, the filter can, however, be realized. In this case, the phases of the sampled values are realized by corresponding propagation delays:

$$H(j\omega) = \sum_{k=0}^{N} |a_k| \cdot e^{j\phi_1} \cdot e^{-jk\omega\tau} \quad (10)$$

$$H(j\omega) = \sum_{k=0}^{N} |a_k| \cdot e^{-jk\omega(\tau-\tau_b)} \quad (11)$$

where $$\tau_k = \frac{\phi_k}{k\omega_0}$$

and $\omega \approx \omega_0$.

In this case, $\omega_0 = 2\pi c/\lambda_0$ is the angular frequency at which the phase is to be reached exactly (for example, at $\lambda_0 = 1.55 \mu m$).

Figure 5:
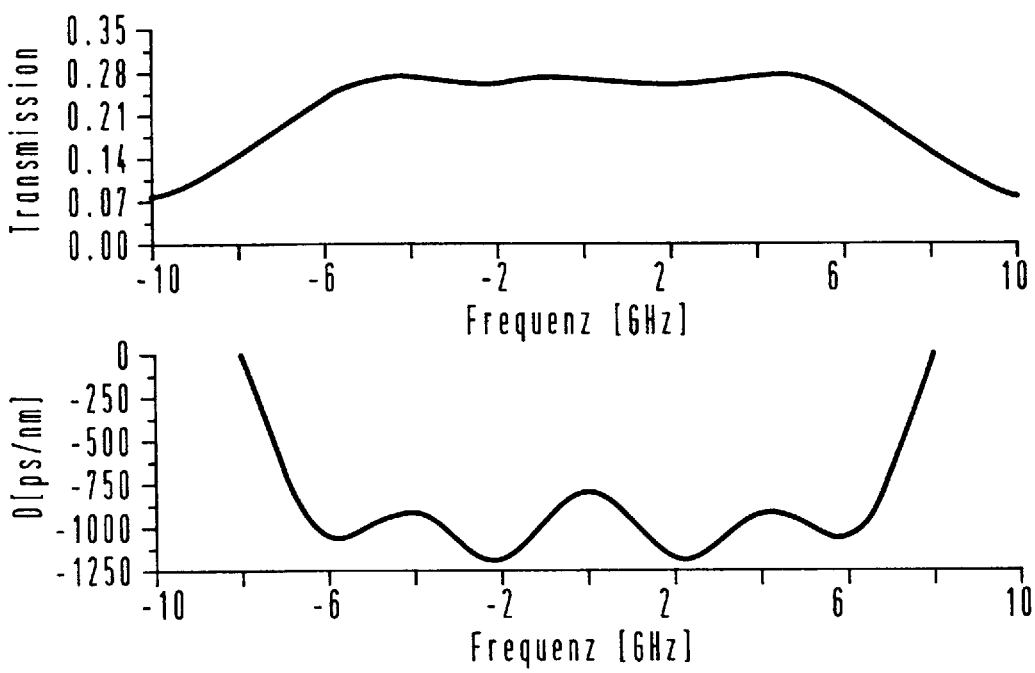
FIG. 5 shows the transmission and dispersion of a filter for dispersion compensation.

The use of the 13 sampled values delimited in FIG. 4 yields the characteristics shown in FIG. 5 for transmission and dispersion. In this case, the waviness of the dispersion is relatively high, which is to be ascribed to the fact that it was not the entire pulse response which was considered, but only 13 sampled values in it.

Figure 6:
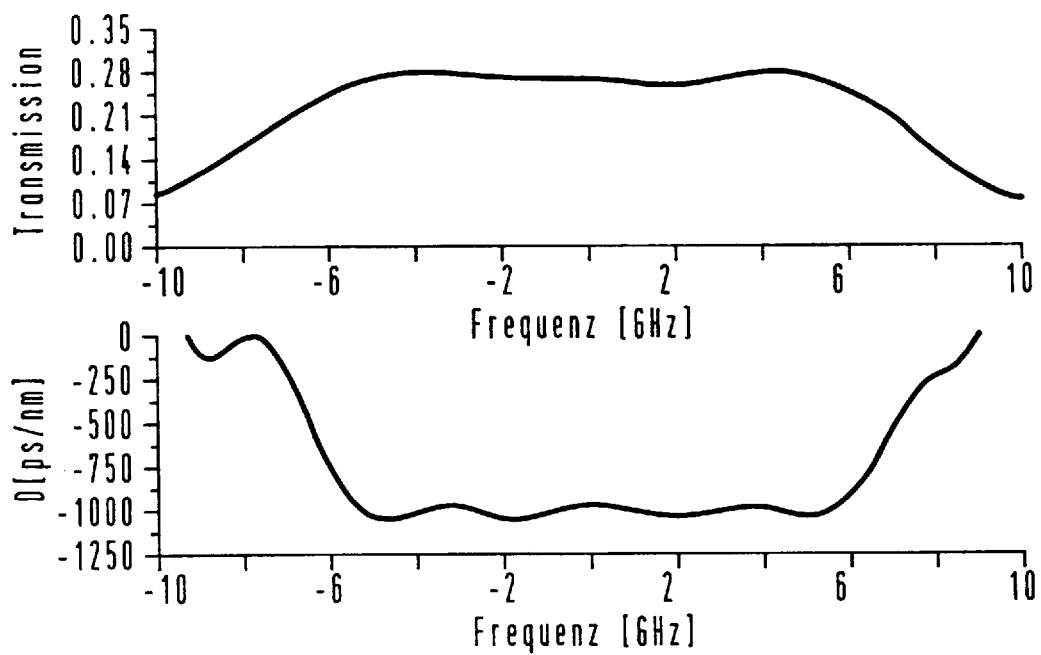
FIG. 6 shows the transmission and dispersion of an optimized filter for dispersion compensation.

In order to achieve better characteristics even with such a limited number of sampled values, it is possible to carry out optimization with the aid of a computer in which the amplitudes (absolute values) and phases (arguments) of the sampled values are varied. FIG. 6 shows the result of such an optimization, on the basis of which the filter acquires a relatively constant dispersion of −1000 ps/nm over a bandwidth of 10 Ghz, the transmission in this range having a prominent maximum which is just as wide.

The example considered here is based on a free spectral range FSR=31.6 Ghz.

As the scaling on the transmission curve (in FIGS. 5 and 6) shows, the filter has an attenuation of approximately 5.5 dB. It is also possible to design for the same dispersion a filter having frequency-independent transmission, it being possible for the attenuation to be approximately 7.5 dB.

The following may be remarked about here for the purpose of understanding the attenuation which is present in principle with transverse filters: the sum of the absolute values of all the sampled values of an ideal lossless transverse filter is unity. However, the transmission will only be unity if all the waves are added with the same phase when combining the individual power components. This will be possible only in a very narrowband fashion, because of the propagation delay differences of the individual components. However, filters for dispersion compensation should be as broadband as possible, it being the case then that not all phases of the power components then will correspond to one another at any frequency over the entire bandwidth.

As has already been said above, in the exemplary embodiment in accordance with FIG. 2 the amplitudes of the individual filter coefficients are realized by the coupling factors of the individual combiners and splitters, it also being necessary when dimensioning to take account of the effects of the couplers situated upstream of the respective splitter or downstream of the respective combiner, and the filter structure expediently being symmetrical, that is to say the same coupling factors are provided for coupling out and launching, with the result that additional losses are avoided when combining the power components. The following coupling factors result for the optical transverse filter outlined above:

$k_0$=−22.97 dB, $k_1$=−20.28 dB, $k_2$=−17.91 dB, $k_3$−13.45 dB, $k_4$=−9.77 dB, $k_5$=−5.68 dB, $k_6$=−4.63 dB, $k_7$=−2.54 dB, $k_8$=−2.46 dB, $k_9$=−2.57 dB, $k_{10}$−2.85 dB, $k_{11}$=−1.99 dB.

The path length corresponding to the propagation delay difference τ=31.64 ps required for FSR=31.6 Ghz is (given a refractive index of n=1.5) 6.3 mm.

By varying the propagation delay τ, it is possible to achieve an interchange between bandwidth B and dispersion D to the extent that the product $B^2D$ remains constant for the relevant filter. A variation in the propagation delay τ produces, as it were, an extension or compression of the frequency scale of the otherwise unchanged filter characteristic; doubling the bandwidth is reflected in a reduction in the dispersion D by the factor 4. Arbitrary values can be provided in principle for B and D. In the case of relatively large values of $B^2D$, however, a relatively large number of sampled values will be required, and this sets corresponding limits to the realization. It is seen in practice that sampled values which are smaller than 2.5% of the maximum sampled value do not have to be realized. This boundary condition is also in force for the exemplary embodiment explained here.

Whereas in the case of a constant bandwidth the dispersion rises approximately linearly with the number of the sampled values, the rise in the attenuation caused by the filter principle decreases with an increasing number of sampled values, and so the ratio of dispersion to attenuation improves. Thus, this ratio is, for example, 709 ps/nm/dB for a bandwidth of 10 Ghz and 57 sampled values; in the case of 250 ps/nm/dB, as is currently being achieved with dispersion-compensating fibers, this transverse filter may well further deliver approximately 26 dB of additional attenuation, in order nevertheless to achieve better results overall than in the case of dispersion-compensating fibers. It may be recalled that these characteristics of the transverse filter by comparison with the fiber are linked to a not excessively large bandwidth; for a bandwidth of 20 Ghz, the dispersion referred to the attenuation in principle would have a value of 177 ps/nm/dB in the example.

As also indicated in FIG. 2, heating elements W can be fitted in the branches of the optical transverse filter for the purpose of fine tuning of the phases (arguments) of the individual (complex) sampled values. It is also possible to provide tunable directional couplers which also permit the setting of the absolute values of the sampled values. Providing heating elements or tunable couplers is likewise known per se in the case of optical transverse filters (from J. Lightwave Technol., Volume 12 (1994), pages 664 . . . 669), and so there is no need for any more detailed explanations here.

Given appropriate dimensioning of the filter, the transmission (see FIG. 6) can serve to stabilize the filter at the wavelength of the transmitting laser. The filter curve can be shifted by uniformly varying the propagation delays of all the branches with the aid of the heating elements. Conversely, however, it is also possible to stabilize the transmitter wavelength on the filter curve, something which will come into consideration, in particular, for large filters. In this case, it would suffice to calibrate the filter once, if necessary, and only the temperature of the filter would have to be kept constant in operation.

Although various minor changes and modifications might be proposed by those skilled in the art, it will be understood that my wish is to include within the claims of the patent warranted hereon all such changes and modifications as reasonably come within my contribution to the art.

I claim as our invention:

1. A circuit arrangement for dispersion compensation in an optical transmission system, comprising:
   an optical transmission system; and
   an optical transverse filter as a negative filter for dispersion compensation in said optical transmission system.

2. The circuit arrangement according to claim 1 wherein the optical transverse filter has a series of directional couplers which respectively follow one another at a spacing of τ/2 and are operated as splitters, and a series of directional couplers which likewise follow one another at a spacing of τ/2 and are operated as combiners, a second output of each directional coupler of the directional couplers being operated as splitters leading in each case to a second input of a respectively corresponding directional coupler operated as a combiner.

3. The circuit arrangement according to claim 2 wherein two mutually corresponding directional couplers in each case have at least approximately same coupling factors.

4. The circuit arrangement according to claim 1 wherein heating elements are provided in branches of the optical transverse filter.

5. The circuit arrangement according to claim 1 wherein tunable directional couplers are provided.

6. A circuit arrangement for dispersion compensation in an optical transmission system, comprising:

an optical transmission system;

an optical transverse filter as a negative dispersion filter for said dispersion compensation in said optical transmission system;

said negative dispersion filter comprising a circuit input having a plurality of splitter directional couplers connected in series thereto, the splitter directional couplers having a spacing of $\tau/2$ from each other and each having an input and first and second outputs;

said negative dispersion filter also comprising a circuit output having a plurality of combiner directional couplers connected in series thereto and having a spacing of $\tau/2$ from each other, each combiner directional coupler having first and second inputs and an output;

a first of the splitter directional couplers having its input connecting to said circuit input and remaining ones of said splitter directional couplers having their respective inputs connecting to a respective first output of a preceding directional coupler;

a first of said combiner directional couplers having its output connected to said circuit output and remaining ones of said combiner directional couplers having their respective first inputs connected to respective outputs of preceding combiner directional couplers; and the second outputs of said splitter directional couplers connecting to the respective second inputs of the respective combiner directional couplers.

7. The circuit arrangement according to claim 6 wherein the respective connections of the second outputs of the splitter directional couplers to the second inputs of the respective combiner directional couplers each comprise a heating element.

\* \* \* \* \*